(12) United States Patent
Sayilgan et al.

(10) Patent No.: US 8,925,864 B2
(45) Date of Patent: Jan. 6, 2015

(54) COMPONENT, IN PARTICULAR A SHELL COMPONENT, WHICH CAN BE JOINED THERMALLY AND/OR MECHANICALLY, FOR BUILDING A FUSELAGE SECTION OF AN AIRCRAFT

(75) Inventors: Cihangir Sayilgan, Hamburg (DE); Robert Alexander Goehlich, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 504 days.

(21) Appl. No.: 12/797,282

(22) Filed: Jun. 9, 2010

(65) Prior Publication Data
US 2011/0031350 A1  Feb. 10, 2011

Related U.S. Application Data
(60) Provisional application No. 61/185,229, filed on Jun. 9, 2009.

(30) Foreign Application Priority Data
Jun. 9, 2009 (DE) .................. 10 2009 024 397

(51) Int. Cl.
*B64C 1/00* (2006.01)
*B64C 1/12* (2006.01)
*B29C 70/88* (2006.01)
*B32B 15/01* (2006.01)
*B29L 31/30* (2006.01)

(52) U.S. Cl.
CPC .............. *B64C 1/12* (2013.01); *B29C 70/885* (2013.01); *B32B 15/01* (2013.01); *B29L 2031/3082* (2013.01); *B64C 2001/0072* (2013.01); *B64D 2221/00* (2013.01); *Y02T 50/433* (2013.01); *Y02T 50/43* (2013.01)
USPC ............ 244/119; 244/131; 244/133; 403/364

(58) Field of Classification Search
USPC ................. 244/120, 119, 131, 132, 133, 124, 244/123.2; 403/364; 428/57, 58; 52/588.1, 52/592.1
See application file for complete search history.

(56) References Cited

U.S. PATENT DOCUMENTS

| | | | | |
|---|---|---|---|---|
| 5,160,771 A * | 11/1992 | Lambing et al. | ................. | 428/57 |
| 5,601,034 A * | 2/1997 | Tao et al. | ................. | 105/423 |
| 7,115,323 B2 * | 10/2006 | Westre et al. | ................. | 428/593 |
| 7,875,333 B2 * | 1/2011 | Stephan | ................. | 428/60 |
| 2008/0292849 A1 * | 11/2008 | Stephan | ................. | 428/192 |

* cited by examiner

*Primary Examiner* — Rob Swiatek
*Assistant Examiner* — Vicente Rodriguez
(74) *Attorney, Agent, or Firm* — Leydig, Voit & Mayer, Ltd.

(57) ABSTRACT

A component for building a fuselage section of an aircraft includes a border area connectable to a corresponding further border area of a further component so as to form an electrically conductive joint, wherein the component includes a composite structure.

20 Claims, 3 Drawing Sheets

COMPONENT, IN PARTICULAR A SHELL COMPONENT, WHICH CAN BE JOINED THERMALLY AND/OR MECHANICALLY, FOR BUILDING A FUSELAGE SECTION OF AN AIRCRAFT

CROSS REFERENCE TO PRIOR APPLICATIONS

Priority is claimed to German Application No. 10 2009 024 397.6, filed on Jun. 9, 2009 and to U.S. Provisional Application No. 61/185,229, filed on Jun. 9, 2009. The entire disclosure of both applications is incorporated by reference herein.

FIELD

The invention relates to a component, in particular to a shell component, which can be joined thermally and/or mechanically, for building a fuselage section of an aircraft, wherein the component has a composite structure.

BACKGROUND

In present-day aircraft construction, fuselage sections are still predominantly produced from metal materials, for example from materials comprising aluminium alloys or titanium alloys. Providing a round return for electrical consumers, safeguarding adequate lightning protection, and creating an adequate shielding effect vis-à-vis high-frequency electromagnetic interference radiation, do not pose a significant problem in such aircraft fuselages that are essentially purely made from metal, because the electrically adequately conductive exterior skin of the fuselage section can itself be used as a ground return for electrical consumers, and furthermore provides adequate protection vis-à-vis atmospheric high-voltage discharge, for example lightning strikes, and moreover also provides an adequate shielding effect vis-à-vis electromagnetic interference radiation.

In particular for reasons relating to saving weight, and to more favourable corrosion behaviour in the long term, and to the associated reduced maintenance and operating expenditure, in modern aircraft construction the use of composite materials, for example carbon-fibre-reinforced epoxy resins (CFRP materials), is increasingly common in the production of aircraft fuselage sections and of effective aerodynamic surfaces. However, carbon-fibre-reinforced epoxy resins are associated with a disadvantage in that they provide limited electrical conductivity, which requires additional measures for lightning protection and ground return of electrical consumers.

In order to achieve the required limited conductivity for ground return and in order to ensure the necessary lightning protection, from the state of the art it is known to arrange metal ground return rails by means of suitable fastening elements on the inside of the aircraft fuselage cell constructed with fibre composite materials. However, such ground return rails increase the weight of the aircraft fuselage section, without, however, substantially contributing to improved structural strength.

SUMMARY OF THE INVENTION

An aspect of the invention is to provide a component comprising a composite structure, in which component, as a result of thermally joining further correspondingly constructed components, electrically-conductive joints are formed, which, apart from their structural core function in the form of load transmission, without any further increase in weight can be directly used for ground return for electrical consumers, and/or for lightning protection.

Because a border area of the component can be connected to a border area of a further component that has a composite structure so that an electrically conductive joint is formed, joining the components to form a larger construction unit, for example to form a fuselage section of an aircraft fuselage or of an aerofoil, creates an electrically conductive network comprising (longitudinal and transverse) joints, which network can directly be used as a ground return for electrical consumers in the aircraft, and where appropriate also as lightning protection for the entire aircraft fuselage section. The term "composite structure" refers to a complex and in some regions different layer design comprising metal layers and layers formed from a fibre-reinforced thermoplastic or duroplastic material.

The term "thermally joining" in the context of the present description and without any claim to completeness refers to methods such as, for example, friction-stir welding methods, laser-beam stir welding methods, protective-gas welding methods, arc-welding methods, electrode-welding methods, autogenous welding methods, friction welding methods as well as all soldering methods. The term "mechanically joining" in this context refers to riveting together or bolting together two components.

According to an advantageous improvement of the component it is provided for the border area of the component to comprise a layer structure with a plurality of electrically conductive metal layers arranged one on top of the other, wherein the metal layers comprise in particular an aluminium alloy, a titanium alloy, a stainless steel alloy or any combination thereof.

Due to the metal layers arranged one on top of the other the border area comprises adequate electrical conductivity in order, after joint-forming joining of a further component of the same type with a corresponding border area, to be able to be used as a ground return for electrical consumers and/or as lightning protection. Preferably titanium alloys, aluminium alloys, stainless steel alloys or a combination of at least two of these alloy types are used as metal layers.

An advantageous improvement of the component provides for a hybrid region of the component to comprise a layer structure formed from a plurality of composite-material layers and metal layers which in each case are arranged in an alternating manner one on top of the other.

Both from the point of view of the mechanical structure and from the point of view of electrics the hybrid region represents a transition between the border area of the component that comprises good electrical conductivity and the remaining surface regions (outside the border) of the component, which surface regions exclusively comprise a composite material of poor electrical conductivity, for example a carbon-fibre-reinforced epoxy resin or a glass-fibre-reinforced polyester resin. Apart from this the hybrid region provides an even load transition between the surface regions comprising composite materials and the border areas which exclusively comprise electrically conductive metal materials. As a result of the reciprocally interlocking fan-shaped layer structure of the hybrid region comprising composite-material layers (e.g. CFRP) and the metal layers (e.g. titanium alloy foils or aluminium foils), preferably reciprocally bonded or "baked" over the entire area to the aforesaid with the use of pressure and/or temperature, a tight bond, which is mechanically highly loadable, between the surface region of the component and its border area is achieved. At least in the region of at least one component edge of the component a continuous border area and, adjacent to it or making a transition to it, a hybrid region are provided. Preferably, however, all the (joining) edges of the components are designed as hybrid regions comprising metal border areas.

An improvement of the invention provides for the surface regions of the components to comprise a plurality of composite-material layers arranged one on top of the other.

In this way those regions of the component, which regions extend over the largest surface area, can be produced with a weight-saving but nevertheless mechanically highly loadable material. Preferably, the composite-material layers comprise a fibre-reinforced thermoplastic or fibre-reinforced duroplastic material.

A further advantageous embodiment provides for the material thickness of the composite-material layers to approximately correspond to the material thickness of the metal layers.

In an ideal case this leads to the achievement of complete and tight joining by interlocking or interleafing and consequently to a high-strength mechanical and structural connection of two components in the border area and thus in the region of a joint to be produced by means of a joining process. Furthermore, in hybrid regions of the components in which composite-material layers alternate layer-by-layer with metal layers, a structure is achieved that is advantageous from the point of view of its mechanical structure.

The overall flat component preferably comprises a material thickness of up to 3.0 cm, wherein the material thickness of the metal layers and of the composite-material layers in each case ranges up to 0.3 mm. In this arrangement the component can comprise a planar, a one-dimensionally or two-dimensionally (spherically) curved surface geometry.

In an advantageous embodiment of the component the composite-material layers comprise a fibre-reinforced plastic material, in particular a carbon-fibre-reinforced epoxy resin.

As a result of the above the component has excellent mechanical characteristics, good corrosion resistance, and, moreover, can be produced economically and with good dimensional stability.

A further advantageous embodiment of the component provides for the border area of the component to be connectable to at least one further component by means of welding together, soldering together, riveting together, bolting together or any combination of the mentioned methods for creating the joint.

As a result of the applicability of a plurality of different thermal and/or mechanical joining techniques the component can be universally flexibly used in the production of large-format assemblies, for example entire fuselage sections or aerofoils, wherein, as a result of the joining process, at the same time an electrically conductive network comprising (longitudinal and transverse) joints arises between the components according to the invention, which network can serve as ground return for electrical consumers and/or for lightning protection purposes.

A further advantageous embodiment provides for the joints formed in each case between several joined components to form a grounding network for the ground return for electrical consumers.

As a result of the network-like structure formed by the plurality of electrically conductive joints between the components, a high-current-capable ground return results which obviates the need for routing additional electrical grounding lines, thus contributing to a general reduction in weight.

DETAILED DESCRIPTION

Figure 1:
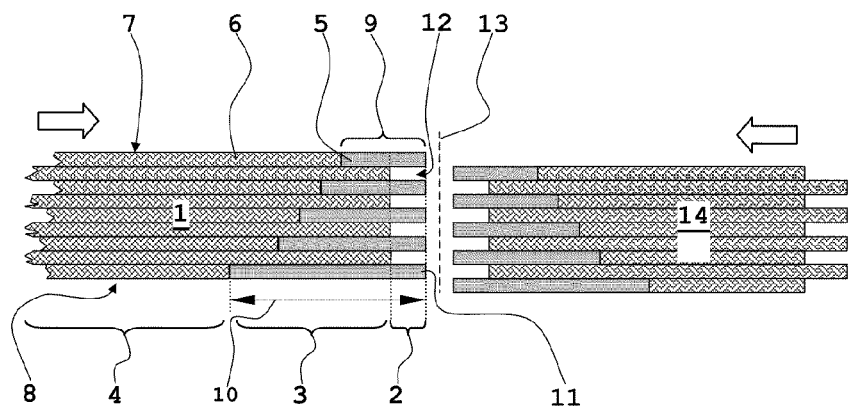
FIG. 1 a cross-sectional view of two components that have not yet been joined, according to a first embodiment variant, FIG. 2 a cross-sectional view of the components from FIG. 1 that were thermally joined while producing an electrically conductive joint, FIG. 3 a cross-sectional view of two components that have not yet been joined, according to a second embodiment, FIG. 4 a cross-sectional view of the components from FIG. 3 that were thermally joined while producing an electrically conductive joint, FIG. 5 a third embodiment variant of the components for creating an electrically conductive joint, FIG. 6 a perspective view of two components that have been joined along an electrically conductive (longitudinal) joint to form a fuselage (sub-) section, with a ground return, and FIG. 7 a diagrammatic section view, in the region of the joint, of the components shown in FIG. 6.

FIG. 1 illustrates a cross-sectional view of two components according to a first embodiment variant, implemented according to the invention but not joined yet.

A first component 1 comprises a border area 2, a hybrid region 3 or mixed region, as well as a surface region 4. In the border area 2 a plurality of electrically conductive metal layers are arranged one on top of the other, wherein one metal layer 5, representative of all the remaining ones, has been given a reference number. In the surface region 4 the component 1 exclusively comprises a plurality of composite-material layers arranged over the entire area one on top of the other, wherein one of the composite-material layers 6, representative of all the remaining ones, has been given a reference number. In contrast to this, in the hybrid region 3 each metal layer 5 alternates with a composite-material layer 6, wherein at the top 7 and at the bottom 8 of the component 1 in each case a metal layer finishes the layer structure. The metal layers 5 in the border area 2 and in the hybrid area 3 extend evenly, spaced apart from each other so as to be parallel, wherein the space (not designated) between the metal layers preferably in each case corresponds to the material thickness of the composite-material layers. The metal layers 5 preferably comprise titanium alloy, while the composite-material layer 6 preferably comprises carbon-fibre-reinforced epoxy resin (CFRP). The titanium alloys used for forming the metal layers comprise adequate electrical conductivity for the purpose of ground return and/or lightning protection.

As an alternative, aluminium alloys or stainless steel alloys can also be used as metal layers, wherein in the selection of the material for the composite-material layer it is, however, necessary to take into account the corrosion resistance and/or the structural strength in the interaction with the metal material used. For example, for reasons relating to corrosion protection, metal layers comprising aluminium alloys cannot be combined without further ado with composite-material layers comprising CFRP materials. As a rule, metal layers comprising aluminium alloys can only be combined with layers comprising glass-fibre-reinforced polyester resins or glass-fibre-reinforced epoxy resins (Glare®).

The length 9 of the uppermost metal layer 5 is preferably shorter than the length 10 of the lowermost metal layer 11; in other words, the lengths of the metal layers in the border area 2 and in the hybrid region 3, starting from the top 7 to the bottom 8 of the component 1, increase in a stepped manner in order to provide effective load transmission. As an alternative it is possible to select the lengths of the metal layers in the respective layers of the component 1 so that they are the same. The material thicknesses of the composite-material layers and of the metal layers are preferably selected so as to be the same, in order to ensure a uniform material structure. Between the metal layers in the border area 2 there are a plurality of small rectangular cavities 12, in other words in this region the metal layers extend parallel to each other so as to be evenly spaced apart from each other.

FIG. 1 shows a further component 14, which is mirror-inverted relative to the symmetry axis 13, with the design of said component 14 corresponding exactly to that of component 1 already explained above. All the composite-material layers and metal layers in both components 1, 14 are firmly interconnected or joined (baked together), which can, for example, take place by bonding over the entire surface at high pressure so that a mechanically highly-loadable composite structure arises. The two arrows pointing in opposite directions indicate the direction in which both components 1, 14 are joined (compare FIG. 2). For the sake of clarity, the adhesive layers which as a rule are required between the respective layers in order to produce the components 1, 14 in a composite design or in a mixed design are not shown in FIGS. 1 and 2, nor in any subsequent figures.

Figure 2:
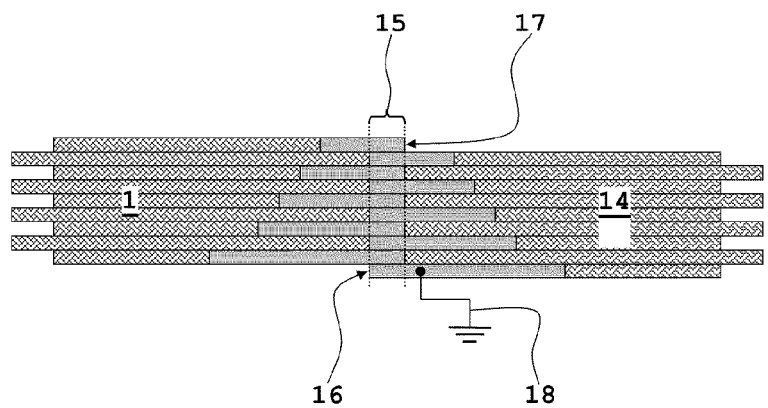

FIG. 2 shows a basic cross-sectional diagram of the components from FIG. 1 that were welded together thus creating a joint.

The components 1, 14 are welded together so as to create an electrically conductive joint 15 or a joint region with the use of one of the above-mentioned thermal joining methods. In this process the metal layers of the components 1, 14 in each case alternately engage each other; in other words both border areas in the region of the joint 15 are "interleafed" in order to ensure optimal structural and mechanical characteristics of the connection. As a result of the interleafing of the opposite border areas, in an ideal case the cavities present in FIG. 1 are fully closed so that there is no need to fill them with a filler. Due to the interleafing of the two components, depending on the welding process, in the region of the joint 15 two small vertically opposing steps 16, 17 can form, whose height in each case corresponds to the material thickness of the metal layers. According to the invention, the electrically conductive joint 15 is connected to a ground return 18 for electrical consumers (not shown in FIG. 2). The components 1, 14 designed in this way provide a production-related advantage in that the extremely stiff surface regions, formed with the use of fibre-composite materials, can be thermally and/or mechanically joined in a simple manner, wherein at the same time a tolerance compensation option is created. There is no longer any need to provide elaborate shim methods to compensate for production tolerances, as is otherwise mandatory in pure fibre-composite components, in particular in CFRP shell components. Furthermore, the alignment processes that are necessary prior to the actual joining of the components are simplified.

Figure 3:
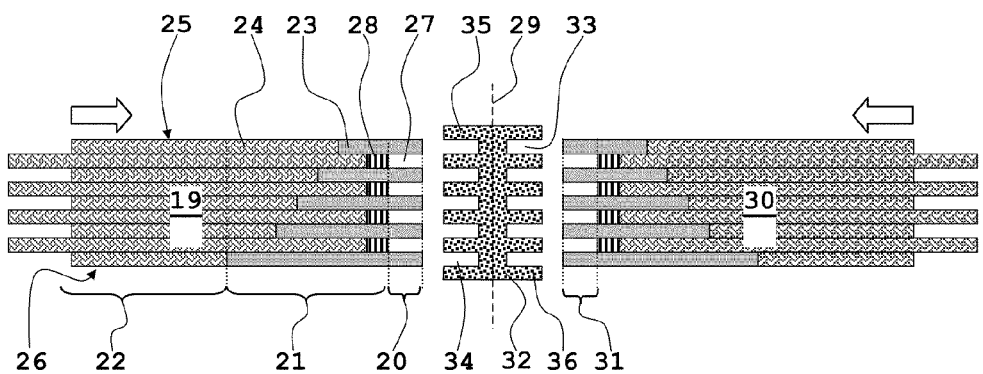

FIG. 3 shows a cross-sectional view of two not yet joined components according to a second embodiment variant.

A first component 19 comprises a narrow metal border area 20 which makes a transition to a hybrid region 21 and subsequently to a surface region 22. The border area 20 in turn comprises a plurality of metal layers, arranged one on top of the other so as to be spaced apart, wherein one of said metal layers is designated 23. The hybrid region 21 is constructed in an alternating layer sequence comprising metal layers 23 and composite-material layers 24. Preferably, the top 25 and the bottom 26 of the component 19 comprise a metal layer each. In the region of the top 25 of the left-hand component 19 the metal layer 23 and the composite-material layer 24 abut each other. The same applies to the composite-material layers and metal layers (not designated by reference characters) situated in the region of the bottom 26 of the component 9, as well as to all the further layers.

A cavity, comprising an approximately rectangular cross-sectional geometry, between two metal layers is designated 27, representative of all the remaining cavities. Each cavity comprises a height that approximately corresponds to the material thicknesses of the composite-material layers. In contrast to the first exemplary embodiment, generally speaking between the metal layers at the front, adjacent to the composite-material layers, a plurality of separating sections are provided for corrosion protection, with one of said separating sections being designated 28. The separating sections 28 comprise an approximately rectangular cross-sectional geometry and are joined, preferably without leaving a gap, between two respective metal layers while leaving open the cavity 27. Depending on the material compositions of the composite-material layers and of the metal layers, as well as well as on the associated corrosion risks, the separating sections can be constructed from a wide variety of duroplastic, thermoplastic and/or metal materials.

In a mirror-inverted manner relative to a symmetry axis 29 there is a second component 30 whose design precisely corresponds to that of the first component 19, including a metal border area 31. Between the components 19, 30 a metal intermediate piece 32 that is necessary for the joining process is positioned, which intermediate piece 32 facilitates, in particular, friction-stir welding of the metal border areas 20, 31 of the components 19, 30. The separating sections for corrosion protection are required only if the intermediate piece 32 comprises an aluminium alloy material, and if the composite-material layers comprise a carbon-fibre-reinforced epoxy resin, because this material composition results in corrosion occurring between the aluminium alloy and the carbon-fibre-reinforced epoxy resins. Without the separating sections 28, the design of the components 19, 30 corresponds exactly to that of the embodiment, already explained in FIGS. 1 and 2, of the first embodiment variant.

A plurality of rectangular recesses, two of which recesses 33, 34 or (longitudinal) grooves comprise reference characters representative of all the remaining ones, are embedded in the intermediate piece 32 of an approximately rectangular comb-like, cross-sectional geometry. The recesses 33, 34 alternate with correspondingly designed small projections on both sides of the intermediate piece 32, wherein two projections 35, 36 comprise reference characters representative of all the others. The recesses or the comb-like projections extend so as to be perpendicular to the drawing plane along the entire length of the intermediate piece 32. In an ideal case the associated metal layers can be inserted with positive fit into the recesses 33, 34, or the projections can be slid into the cavities of the border areas 20, 31 of the components 19, 30. Due to the resulting guidance and temporary position-securing, the thermal joining process, in particular the preferred friction-stir welding process, is facilitated. As far as the selection of materials for the metal layers and composite-material layers of the components 19, 30 is concerned, the explanations already provided in the context of the description of FIGS. 1 and 2 apply.

As an alternative, the intermediate piece 32 can be designed so as to be divided along the symmetry line so that two intermediate pieces arise which are designed so as to mirror each other and to be comb-like in shape on one side, with the rear being smooth. The two-part intermediate piece is associated with an advantage in that during pre-production the two partial intermediate pieces can be integrated in, or attached to, the border areas 30, 31 of the components 19, 30 by means of suitable methods, wherein "smooth" component edges result, which can be thermally joined in particular so as to abut.

Figure 4:
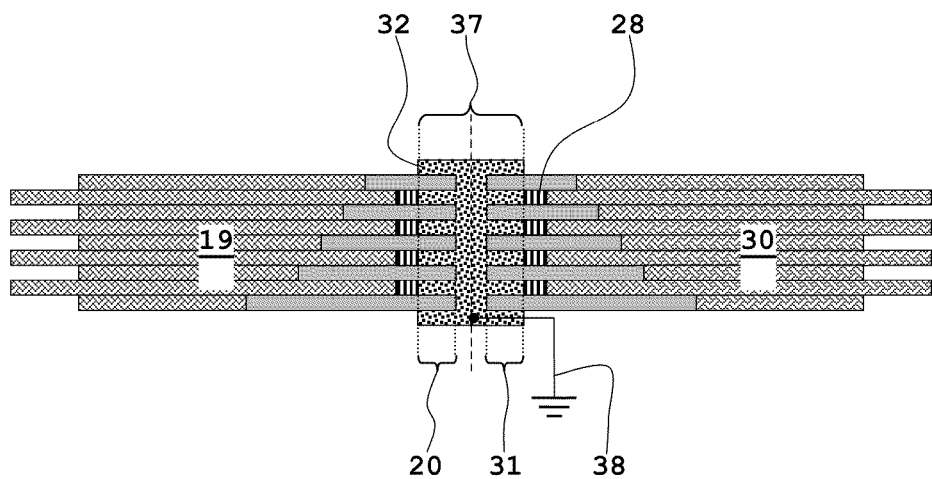

FIG. 4 shows a cross-sectional view of the components according to FIG. 3. which are joined with the use of the intermediate piece. The components 19, 30 are not directly thermally joined so as to abut, but instead the intermediate piece 32 is welded or soldered into place between the border area 20 of the left-hand component 19 and the border area 31 of the right-hand component 30.

In order to create a joint 37, the border areas 20, 31 are firmly joined, by means of suitable thermal joining processes, while incorporating the intermediate piece 32. Suitable thermal joining methods include, for example, friction-stir welding methods, standard welding methods (arc-welding methods, resistance-welding methods), laser welding methods, as well as soldering methods. Furthermore, the intermediate piece 32 facilitates electrical contacting and mechanical connection of a ground return 38 for electrical consumers, for example by means of an integrated threaded hole. Moreover, when compared to the first embodiment variant of the components 1, 14 the intermediate piece 32 makes it possible to achieve a connection without offset between the components 19, 30.

In those cases where the intermediate piece 32 comprises an aluminium alloy, due to the relatively low melting temperature of the aluminium alloy, the components 19, 30, with incorporation of the intermediate piece 32 can advantageously be joined, by means of the known friction-stir welding method, to form a larger assembly, for example a fuselage section of an aircraft. However, the use of aluminium alloy to produce the intermediate piece 32 makes it absolutely necessary to integrate the above-described separating sections or isolation sections (compare reference character 28). In this way it is possible to prevent undesirable corrosion processes between the intermediate piece 32 and the composite-material layers adjoining the former at both ends, which composite-material layers generally comprise carbon-fibre-reinforced epoxy resins.

However, if other metal alloys, especially higher-melting metal alloys, for example titanium alloys and/or stainless steel alloys are used for the intermediate piece 32, it is generally no longer possible to use the friction-stir welding method so that the above-described alternative thermal joining methods need to be used, by means of which methods higher temperatures can be attained in the joining region. In this arrangement there is no need to provide separating sections, because no corrosion effects will occur between titanium alloys and/or stainless steel alloys on the one hand, and carbon-fibre-reinforced epoxy resins on the other hand.

Joining the components 19, 30 with the use of the intermediate piece 32 makes it possible to achieve a connection of the two components 19, 30, which connection is more advantageous from the point of view of the mechanical structure, wherein the application of the friction-stir welding method is proposed. Friction-stir welding itself predominantly takes place in the two facing border areas 20, 31 of the components 19, 30 or of the intermediate piece 32.

Figure 5:
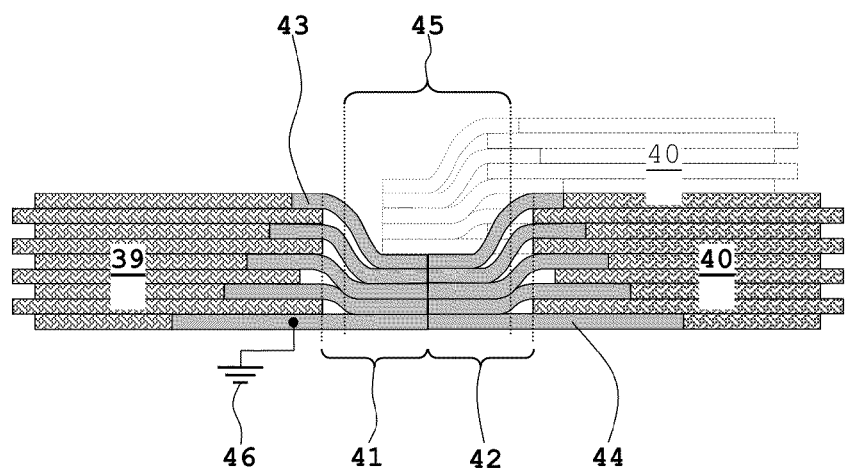

FIG. 5 shows a third embodiment of the components. In contrast to the first two variants of the components according to FIGS. 1 to 4, the components 39, 40 comprise metal layers 43, 44 in the border areas 41, 42, which metal layers are arranged directly one on top of the other. There are no regular or rectangular cavities between the metal layers. This design of the metal layers, which is curved when compared to the embodiment according to FIGS. 1 to 4, can, for example, be achieved by means of a forming process. If applicable, this forming process requires the lengths of the metal layers in the border areas 41, 42 to be varied in such a way that a flush finish of the metal layers, in other words a straight vertical edge, results.

In the region of a joint 45, which is to be produced by means of a suitable thermal joining process, the metal layers 43, 44 of the components 39, 40 in each case form a "compact" metal layer. In order to create the electrically conductive joint 45 the border areas 41, 42 of the components 39, 40 can be butt-joined by means of known thermal joining methods. Again, a ground return 46 for electrical consumers (not shown in FIG. 5) is connected to the electrically conductive joint 45.

Figure 6:
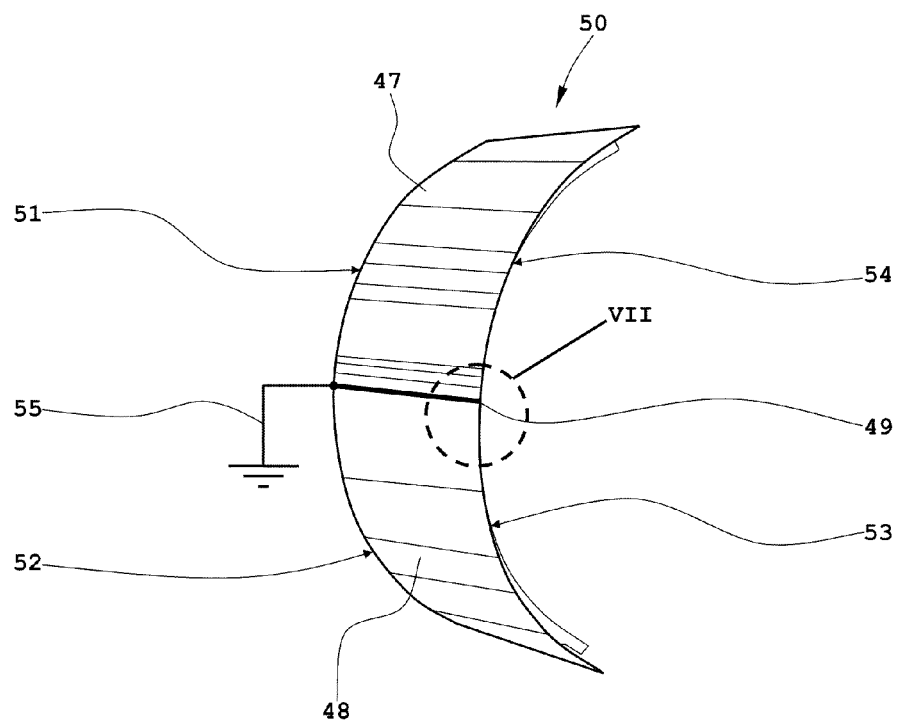

FIG. 6 shows a perspective view of two shell components, joined along an electrically conductive joint to form a fuselage (sub-) section, with a ground return.

Two components, which in this exemplary embodiment are shell components 47, 48, are interconnected along an electrically conductive (longitudinal) joint 49 to form a fuselage (sub-) section 50 of an aircraft. The joint 49 can optionally be produced according to the way described in FIGS. 2 to 5. In order to be able to produce electrically conductive transverse joints, each of the transverse edges 51 to 54 of the shell components 47, 48 comprises a border area whose design corresponds to that of the border area of a component diagrammatically shown in FIGS. 1 to 5 with a plurality of metal layers arranged one on top of the other. According to the invention, a ground return 55 for electrical consumers is connected to the electrically conductive (longitudinal) joint.

From the shell components 47, 48 designed according to the invention it is thus, for example, possible to produce fuselage sections with the creation of a plurality of electrically conductive longitudinal joints. These fuselage sections can then, with the creation of also electrically conductive transverse joints, be integrated to form complete aircraft fuselage sections, wherein the longitudinal joints and the transverse joints create a network-like ground return for electrical consumers and/or a lightning protection device. Preferably, all the components that are used to form the aircraft fuselage section on all sides comprise electrically conductive border areas whose design corresponds to that of the border areas of the components according to FIGS. 1 to 5.

Figure 7:
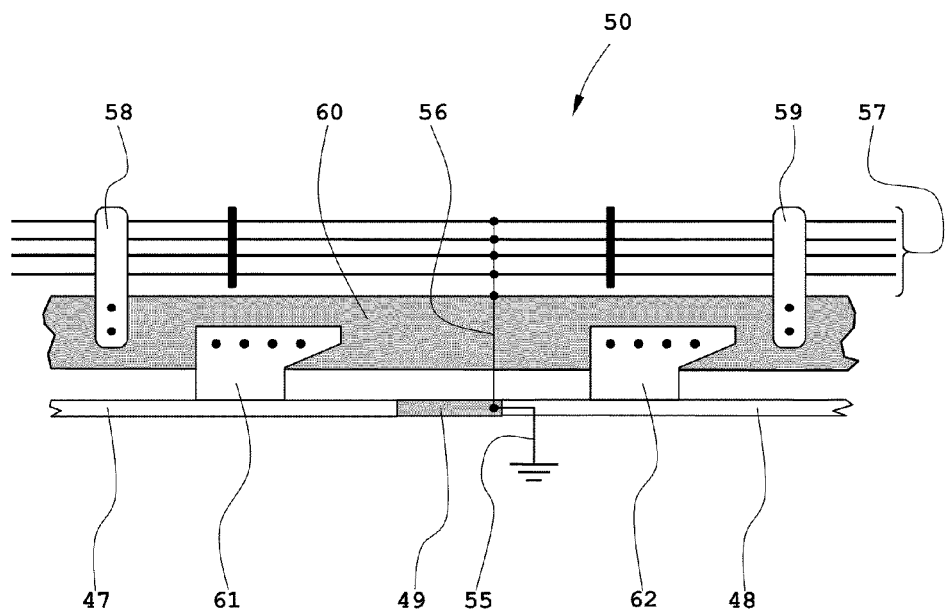

FIG. 7 shows a diagrammatic cross-sectional view in the region of the shell components 47, 48, which are connected by the joint 49, of the fuselage (sub-) section illustrated in FIG. 6.

The shell components 47, 48 are interconnected by means of the electrically conductive (longitudinal) joint 49. This joint 49 is connected to the ground return 55 and, by way of a further connecting line 56, to a plurality of electrical lines 57, which are, for example, used to ensure the supply to electrical consumers. The electrical lines 57 are attached to a frame element 60 by means of two holders 58, 59. The frame element 60 itself is connected, by way of two linkage angles 61, 62, to the shell components 47, 48.

LIST OF REFERENCE CHARACTERS

1 Component (first)
2 Border area (first component)
3 Hybrid region
4 Surface region
5 Metal layer 6 Composite-material layer
7 Top (component)
8 Bottom (component)
9 Length (metal layer)
10 Length (metal layer)
11 Metal layer
12 Cavity
13 Symmetry axis
14 Component (second)
15 Joint (region)
16 Step
17 Step
18 Ground return
19 Component (first)
20 Border area (first component)
21 Hybrid region
22 Surface region
23 Metal layer
24 Composite-material layer
25 Top (component)
26 Bottom (component)
27 Cavity
28 Separating section
29 Symmetry axis
30 Component (second)
31 Border area (second component)
32 Intermediate piece
33 Recess (groove)
34 Recess (groove)
35 Projection
36 Projection
37 Joint (region)
38 Ground return
39 Shell component (first)
40 Shell component (second)
41 Border area
42 Border area
43 Metal layer
44 Metal layer
45 Joint (region)
46 Ground return
47 Shell component
48 Shell component
49 Joint (region)
50 Fuselage (sub-) section
51 Transverse edge
52 Transverse edge
53 Transverse edge
54 Transverse edge
55 Ground return
56 Connecting line
57 Electrical lines (line bus)
58 Holder
59 Holder
60 Frame element
61 Linkage angle
62 Linkage angle

What is claimed is:

1. A component for building a fuselage section of an aircraft, comprising:
a first component including a first border area connectable to a second border area of a second component so as to form an electrically conductive joint between the first border area and the second border area,
wherein the component includes a composite structure,
wherein the first border area includes a layer structure comprising a plurality of electrically conductive metal layers disposed one on top of another,
wherein the electrically conductive metal layers extend outward from the first border area, and
wherein the electrically conductive metal layers of the first component alternately engage metal layers of the second component in each case at the electrically conductive joint so as to fill any cavities between the first and the second components, leaving no void.

2. The component as recited in claim 1, wherein the component is thermally connectable to the second component.

3. The component as recited in claim 1, wherein the component is mechanically connectable to the second component.

4. The component as recited in claim 1, wherein the fuselage section forms a portion of a shell of the fuselage.

5. The component as recited in claim 1, wherein the metal layers include at least one of an aluminium alloy, a titanium alloy, and a stainless steel alloy.

6. The component as recited in claim 1, further comprising:
a hybrid region including a layer structure having a plurality of composite-material layers,
wherein the metal layers extend into the hybrid region, the plurality of composite-material layers and the metal layers disposed so as to alternate one on top of another.

7. The component as recited in claim 6, further comprising:
a surface region including the plurality of composite-material layers disposed one of top of another.

8. The component as recited in claim 6, wherein a thickness of the plurality of composite-material layers corresponds to a thickness of the metal layers.

9. The component as recited in claim 6, wherein the plurality of composite-material layers includes a fiber-reinforced plastic material.

10. The component as recited in claim 9, wherein the fiber-reinforced plastic material is a carbon-fiber-reinforced epoxy resin.

11. The component as recited in claim 1, wherein the first border area is connectable to the second border area using at least one of welding, soldering, riveting, and bolting.

12. A fuselage section of an aircraft, the fuselage section comprising:
a first component including a first composite material having a first border area; and
a second component including a second composite material having a second border area connected to the first border area so as to form an electrically conductive joint,
wherein the first and second border areas each include a layer structure comprising a plurality of electrically conductive metal layers disposed one on top of another,
wherein the electrically conductive metal layers of the first component extend outward from the first border area,
wherein the electrically conductive metal layers of the first and second components extend outwardly, and
wherein the electrically conductive metal layers of the first and second components alternately engage each other in each case at the electrically conductive joint so as to fill any cavities between the electrically conductive metal layers of the first and the second components, thereby leaving no void.

13. The fuselage section as recited in claim 12, wherein the electrically conductive joint is configured to form a ground return for electrical consumers.

14. The fuselage section as recited in claim 12, wherein the first and the second composite materials are the same composite material.

15. The component as recited in claim 1, wherein the metal layers comprise an aluminium alloy.

16. The component as recited in claim 1, wherein the metal layers comprise a titanium alloy.

17. The component as recited in claim 1, wherein the metal layers comprise a stainless steel alloy.

18. The component as recited in claim 15, wherein the metal layers further comprise a titanium alloy.

19. The component as recited in claim 17, wherein the metal layers further comprise a titanium alloy, a stainless steel alloy, or a titanium alloy and a stainless steel alloy.

20. A fuselage section of an aircraft, the fuselage section comprising:
- a first component including a first composite material having a first border area; and
- a second component including a second composite material having a second border area connected to the first border area so as to form an electrically conductive joint, wherein the first and second border areas each include a layer structure comprising a plurality of electrically conductive metal layers disposed one on top of another, wherein the electrically conductive metal layers of the first component extend parallel to each other outward from the first border area such that a plurality of small rectangular cavities are formed between the electrically conductive metal layers, wherein the electrically conductive metal layers of the second component extend parallel to each other outward from the second border area such that a plurality of small rectangular cavities are formed between the electrically conductive metal layers, and wherein the electrically conductive metal layers of the first and second components alternately engage each other in each case at the electrically conductive joint so as to close the small rectangular cavities between the electrically conductive metal layers of the first and the second components.

* * * * *